US011057859B2

(12) United States Patent
Edge et al.

(10) Patent No.: US 11,057,859 B2
(45) Date of Patent: *Jul. 6, 2021

(54) SYSTEMS AND METHODS FOR LIMITING A MESSAGE SIZE FOR A POSITIONING PROTOCOL

(71) Applicant: QUALCOMM Incorporated, San Diego, CA (US)

(72) Inventors: Stephen William Edge, Escondido, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/205,971

(22) Filed: Nov. 30, 2018

(65) Prior Publication Data

US 2019/0110271 A1    Apr. 11, 2019

Related U.S. Application Data

(63) Continuation of application No. 15/707,606, filed on Sep. 18, 2017, now Pat. No. 10,200,967.

(Continued)

(51) Int. Cl.
*H04W 64/00* (2009.01)
*H04W 4/02* (2018.01)
(Continued)

(52) U.S. Cl.
CPC ......... *H04W 64/003* (2013.01); *G01S 5/0036* (2013.01); *G01S 5/0236* (2013.01);
(Continued)

(58) Field of Classification Search
CPC .......... H04L 67/18; H04W 4/02; H04W 4/20; H04W 64/00; H04W 64/003
See application file for complete search history.

(56) References Cited

U.S. PATENT DOCUMENTS

| 7,012,893 B2 | 3/2006 | Bahadiroglu |
| 7,069,000 B1 | 6/2006 | Corson et al. |

(Continued)

FOREIGN PATENT DOCUMENTS

| CN | 104469841 A | 3/2015 | |
| EP | 3512270 A1 * | 7/2019 | ............ H04W 4/029 |
| WO | 2010141884 A1 | 12/2010 | |

OTHER PUBLICATIONS

International Search Report and Written Opinion—PCT/US2017/060931—ISA/EPO—dated Jan. 5, 2018.

(Continued)

*Primary Examiner* — Timothy X Pham

(57) ABSTRACT

Techniques described herein provide ways in which a quantity of signaling may be limited between a user equipment (UE) and a location server (LS) for a location session and a positioning protocol such as LPP or LPP/LPPe. The positioning protocol may be enhanced to allow the LS to indicate to the UE a limit on the overall size of assistance data (AD) that the UE can request and/or a limit on the overall amount of location information (LI) that the UE can return. A recipient UE can then prioritize any request for AD such that more important AD should fit within the size limit. The recipient UE can also prioritize returned location measurements such that more useful measurements are included in a message to the LS that is compliant to the limit indicated by the LS.

27 Claims, 6 Drawing Sheets

Related U.S. Application Data

(60) Provisional application No. 62/443,594, filed on Jan. 6, 2017.

(51) Int. Cl.
| | | |
|---|---|---|
| H04W 4/20 | (2018.01) | |
| H04L 29/08 | (2006.01) | |
| G01S 19/07 | (2010.01) | |
| G01S 5/02 | (2010.01) | |
| G01S 5/10 | (2006.01) | |
| G01S 19/05 | (2010.01) | |
| G01S 5/00 | (2006.01) | |

(52) U.S. Cl.
CPC .............. *G01S 5/10* (2013.01); *G01S 19/05* (2013.01); *G01S 19/07* (2013.01); *G01S 19/071* (2019.08); *G01S 19/074* (2019.08); *H04L 67/18* (2013.01); *H04W 4/02* (2013.01); *H04W 4/20* (2013.01); *H04W 64/00* (2013.01)

(56) References Cited

U.S. PATENT DOCUMENTS

| | | | |
|---|---|---|---|
| 8,472,322 | B2 | 6/2013 | Black et al. |
| 8,780,704 | B2 | 7/2014 | Sambhwani et al. |
| 10,021,681 | B2 | 7/2018 | Larsson et al. |
| 2010/0311438 | A1 | 12/2010 | Edge et al. |
| 2011/0093556 | A1 | 4/2011 | Miyazawa |
| 2011/0159886 | A1 | 6/2011 | Kangas et al. |
| 2012/0244852 | A1 | 9/2012 | Edge et al. |
| 2012/0258733 | A1* | 10/2012 | Fischer ................. H04W 4/029 455/456.1 |
| 2014/0051426 | A1 | 2/2014 | Siomina et al. |
| 2014/0287747 | A1 | 9/2014 | Agarwal |
| 2015/0139152 | A1 | 5/2015 | Edge et al. |
| 2016/0112898 | A1 | 4/2016 | Chen et al. |
| 2016/0157208 | A1* | 6/2016 | Liang .................. H04W 72/005 455/458 |
| 2017/0099682 | A1* | 4/2017 | Priyanto ........... H04W 74/0833 |
| 2018/0054795 | A1* | 2/2018 | Edge ....................... H04W 4/02 |
| 2018/0199306 | A1 | 7/2018 | Edge et al. |
| 2019/0021021 | A1* | 1/2019 | Thangarasa ............. H04W 4/70 |
| 2020/0252902 | A1* | 8/2020 | Edge ....................... H04W 4/02 |

OTHER PUBLICATIONS

ZTE: "Consideration on coverage enhancement level issues for NB-IoT", 3GPP TSG-RAN WG2 meeting #92, R2-156270, Anaheim, US, Nov. 16-20, 2015, 3 Pages.

* cited by examiner

SYSTEMS AND METHODS FOR LIMITING A MESSAGE SIZE FOR A POSITIONING PROTOCOL

RELATED APPLICATIONS

This application is continuation of U.S. application Ser. No. 15/707,606, filed Sep. 18, 2017, entitled "SYSTEMS AND METHODS FOR LIMITING A MESSAGE SIZE FOR A POSITIONING PROTOCOL," which claims the benefit of U.S. Provisional Application No. 62/443,594, filed Jan. 6, 2017, entitled "MESSAGE SIZE LIMITS FOR THE LTE POSITIONING PROTOCOL," both of which are assigned to the assignee hereof, and incorporated by reference herein in their entirety.

BACKGROUND

1. Field

The subject matter disclosed herein relates to wireless communications systems, and more particularly to systems and methods for location of a user equipment in a wireless communications system using a positioning protocol.

2. Information

It is often desirable to know the location of a user equipment (UE) such as a cellular phone. The location can be used for any of a variety of applications, such as to enable a UE to provide navigation information to a user, to enable a person or asset finder service, or to provide a location of a UE to emergency responders for an emergency services call. The process of determining the location of the UE may involve, among other things, communication between the UE and a location server (LS) using a positioning protocol. However, bandwidth limitations, signal noise, and associated message transfer delays may limit the number and size of messages for a positioning protocol that can be transferred between the UE and an LS for location determination, which may lead to less accurate location, less reliable location and/or a longer delay in location. Methods to avoid and to mitigate such consequences may therefore be desirable.

SUMMARY

Techniques described herein provide ways in which the quantity of signaling may be limited between a UE and an LS for location determination. In particular, a Long Term Evolution (LTE) positioning protocol (LPP) or an LPP Extensions (LPPe) positioning protocol may be enhanced to allow an LS to indicate to a UE a limit on the overall size of assistance data (AD) that the UE can request and/or a limit on the overall amount of location information (LI) that the UE can return. A recipient UE can then prioritize any request for AD such that more important AD should fit within the size limit. The recipient UE can also prioritize returned location measurements such that more useful measurements are included in a message to the LS that is compliant to the limit indicated by the LS.

An example method at an LS for limiting a quantity of signaling for a location session with a UE, according to the description, comprises, obtaining a coverage level for the UE, determining, based at least in part on the coverage level, a signaling quantity limit for the location session, wherein the signaling quantity limit is for a positioning protocol, and sending, to the UE, a first message for the positioning protocol, wherein the first message comprises the signaling quantity limit.

Embodiments of the method can comprise one or more of the following features. The LS may comprise an Enhanced Serving Mobile Location Center (E-SMLC), a Secure User Plane Location (SUPL) Location Platform (SLP), or a Location Management Function (LMF). The signaling quantity limit may comprise a limit on a total amount of assistance data (AD) sent by the LS to the UE, a limit on a total amount of location information (LI) sent by the UE to the LS, a limit on a total amount of AD sent by the LS to the UE plus LI sent by the UE to the LS, a maximum message size for the positioning protocol sent by the UE to the LS, a maximum message size for the positioning protocol sent by the LS to the UE, or any combination thereof. The coverage level may comprise at least one of a Signal to Noise ratio, a message transfer delay, a round trip signal propagation time, an available bandwidth, a radio access type (RAT), a coverage enhancement level, or any combination thereof. The RAT may comprise a Narrow Band for Internet of Things (NB-IoT) or a Long Term Evolution (LTE). The protocol may comprise a Long Term Evolution (LTE) Positioning Protocol or an LPP/LPP Extensions (LPPe) protocol. The first message may comprise an LPP or LPP/LPPe Request Location Information message. The method may further comprise receiving, from the UE, a second message for the positioning protocol, wherein the second message comprises a request for assistance data (AD), and, in response to receiving the second message, sending a third message for the positioning protocol to the UE, wherein the third message comprises the AD and wherein the third message satisfies the signaling quantity limit. The method may comprise receiving, from the UE, a second message for the positioning protocol, wherein the second message comprises location information (LI), wherein the second message satisfies the signaling quantity limit.

An example method at a UE for limiting a quantity of signaling for a location session with an LS, according to the description, comprises receiving, from the LS, a first message for a positioning protocol, wherein the first message comprises an indication of a signaling quantity limit for the location session, wherein the signaling quantity limit is for the positioning protocol, determining a second message for the positioning protocol, wherein the determination is based, at least in part, on the signaling quantity limit, and sending the second message to the LS.

Embodiments of the method may further comprise one or more of the following features. The signaling quantity limit may comprise a limit on a total amount of assistance data (AD) sent by the LS to the UE, a limit on a total amount of location information (LI) sent by the UE to the LS, a limit on a total amount of AD sent by the LS to the UE plus LI sent by the UE to the LS, a maximum message size for the positioning protocol sent by the UE to the LS, a maximum message size for the positioning protocol sent by the LS to the UE, or any combination thereof. Determining the second message may comprise determining a type of assistance data (AD) to request from the LS, wherein the second message comprises a request for the determined type of AD. The method may further comprise receiving, from the LS, a third message for the positioning protocol, wherein the third message comprises the determined type of AD. Determining the second message may comprise determining a type of location information (LI) to send to the LS, wherein the second message comprises the determined type of LI. The determined type of LI may comprise location measurements or a calculated location. The positioning protocol may comprise a Long Term Evolution (LTE) Positioning Protocol or an LPP/LPP Extensions (LPPe) protocol. The first message may comprise an LPP or LPP/LPPe Request Location Information message. The LS may comprise an Enhanced Serving Mobile Location Center (E-SMLC), a Secure User Plane Location (SUPL) Location Platform (SLP) or a Location Management Function (LMF).

An example LS, according to the description, comprises a communication interface, a memory, and a processing unit communicatively coupled with the communication interface and memory. The processing unit is configured to obtain, via the communication interface, a coverage level for a user equipment (UE), determine, based at least in part on the coverage level, a signaling quantity limit for a location session with the UE, wherein the signaling quantity limit is for a positioning protocol, and send to the UE, via the communication interface, a first message for the positioning protocol, wherein the first message comprises the signaling quantity limit.

Embodiments of the LS may comprise one or more of the following features. The LS comprises an Enhanced Serving Mobile Location Center (E-SMLC), a Secure User Plane Location (SUPL) Location Platform (SLP), or a Location Management Function (LMF). The processing unit may be configured to determine the signaling quantity limit by determining a limit on a total amount of assistance data (AD) sent by the LS to the UE, a limit on a total amount of location information (LI) sent by the UE to the LS, a limit on a total amount of AD sent by the LS to the UE plus LI sent by the UE to the LS, a maximum message size for the positioning protocol sent by the UE to the LS, a maximum message size for the positioning protocol sent by the LS to the UE, or any combination thereof. The processing unit may be configured to obtain the coverage level by obtaining at least one of a Signal to Noise ratio, a message transfer delay, a round trip signal propagation time, an available bandwidth, a radio access type (RAT), a coverage enhancement level, or any combination thereof. The processing unit may be configured to send the first message comprising an LPP or LPP/LPPe Request Location Information message. The processing unit may be further configured to receive from the UE, via the communication interface, a second message for the positioning protocol, wherein the second message comprises a request for assistance data (AD), and in response to receiving the second message, send a third message for the positioning protocol to the UE via the communication interface, wherein the third message comprises the AD and wherein the third message satisfies the signaling quantity limit. The processing unit may be further configured to receive from the UE, via the communication interface, a second message for the positioning protocol, wherein the second message comprises location information (LI), wherein the second message satisfies the signaling quantity limit.

An example UE, according to the description, comprises a communication interface, a memory, and a processing unit communicatively coupled with the communication interface and memory. The processing unit is configured to receive from a location server (LS), via the communication interface, a first message for a positioning protocol, wherein the first message comprises an indication of a signaling quantity limit for a location session with the LS, wherein the signaling quantity limit is for the positioning protocol, determine a second message for the positioning protocol, wherein the determination is based, at least in part, on the signaling quantity limit, and send the second message to the LS via the communication interface.

Embodiments of the UE can comprise one or more the following features. The processing unit may be configured to determine the second message by determining a type of assistance data (AD) to request from the LS, wherein the second message comprises a request for the determined type of AD. The processing unit may be configured to receive from the LS, via the communication interface, a third message for the positioning protocol, wherein the third message comprises the determined type of AD. The processing unit may be configured to determine the second message by determining a type of location information (LI) to send to the LS, wherein the second message comprises the determined type of LI. The processing unit may be configured to obtain the LI by obtaining location measurements, a calculated location, or any combination thereof.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
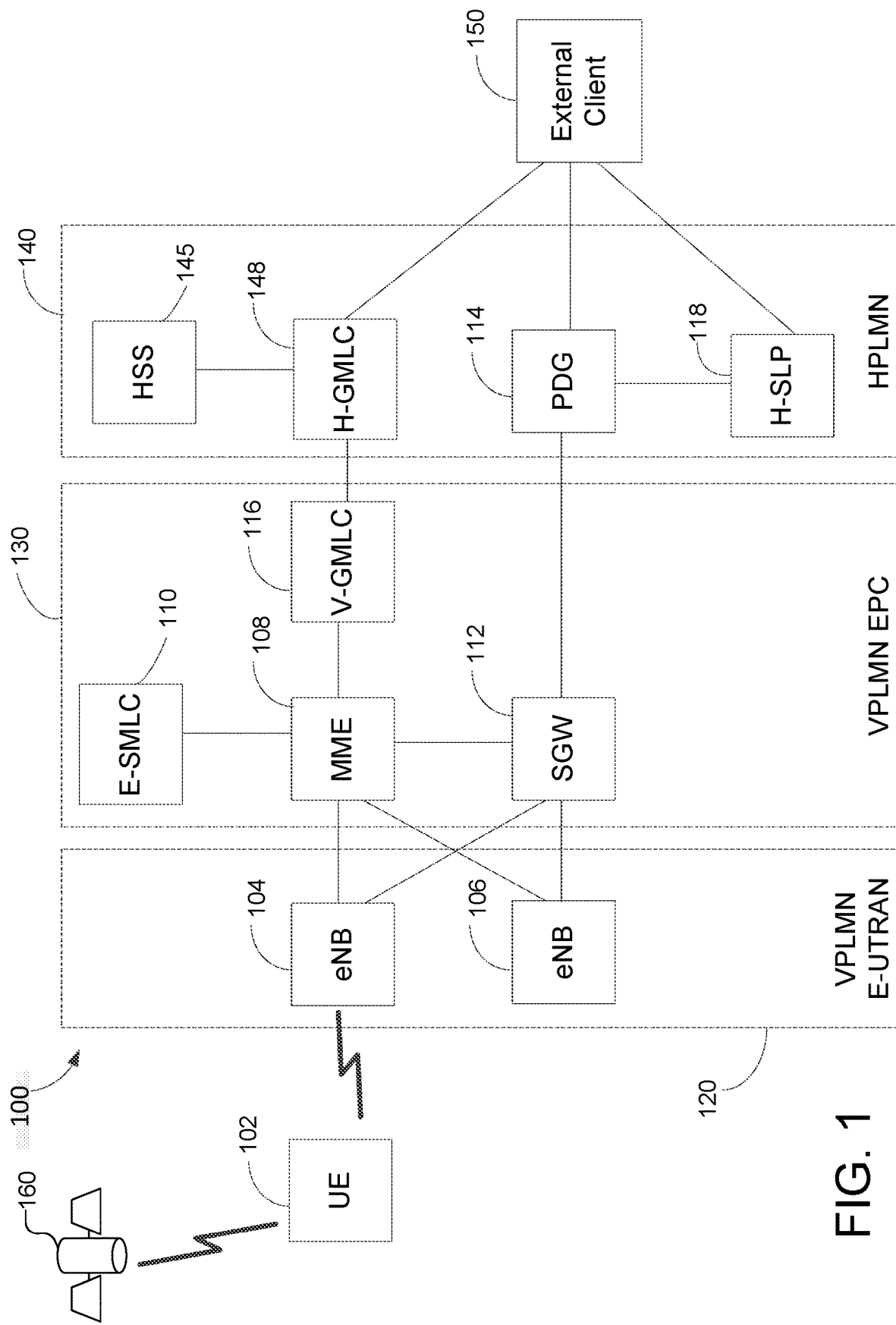
FIG. 1 is a simplified block diagram illustrating the architecture of a system for enabling support of location for a user equipment (UE), according to an embodiment.

It is often desirable to know the location of a user equipment (UE) such as a cellular phone, smartphone or tablet. The location can be used for any of a variety of applications, such as to enable a UE to provide navigation information to a user, to enable a person or asset finder or tracking service, or to provide a location of a UE to an emergency responder for an emergency services call. The process of determining the location of the UE may involve, among other things, communication between the UE and a location server (LS) using a positioning protocol. However, bandwidth limitations for a wireless access, signaling interference and noise, and/or message transfer delays may limit the number and size of messages for a positioning protocol that can be transferred between the UE and an LS for location determination, which may lead to less accurate location, less reliable location and/or a longer delay in location. Methods to avoid and to mitigate such consequences may therefore be desirable.

Several illustrative embodiments are described herein with respect to the accompanying drawings, which form a part hereof. The ensuing description provides embodiment(s) only, and is not intended to limit the scope, applicability or configuration of the disclosure. Rather, the ensuing description of the embodiment(s) provides those skilled in the art with an enabling description for implementing an embodiment. It is understood that various changes may be made in the function and arrangement of elements without departing from the spirit and scope of this disclosure.

It is noted that, in the description below and the related figures, various abbreviations are used. Although definitions of these may be provided in the description, the following table is provided as a reference:

| | |
|---|---|
| 3GPP | 3rd Generation Partnership Project |
| 3GPP2 | 3rd Generation Partnership Project 2 |
| 5G | Fifth Generation |
| AD | Assistance Data |
| AFLT | Advanced Forward Link Trilateration |
| A-GNSS | Assisted GNSS |
| CDMA | Code Division Multiple Access |
| CIoT | Cellular IoT |
| CP | Control Plane |
| DL | Downlink |
| DSL | Digital Subscriber Line |
| D-SLP | Discovered SLP |
| ECID | Enhanced Cell ID |
| eMTC | Enhanced MTC |
| eNB | Evolved Node B |
| EPC | Evolved Packet Core |
| EPS | Evolved Packet System |
| E-SLP | Emergency SLP |
| E-SMLC | Enhanced Serving Mobile Location Center |
| ESS | Extended Service Set |
| E-UTRAN | Evolved UMTS Terrestrial Radio Access Network |
| GMLC | Gateway Mobile Location Center |
| GNSS | Global Navigation Satellite System |
| GSM | Global System for Mobile Communications |
| HeNB | Home eNB |
| H-GMLC | Home GMLC |
| HNB | Home Node B |
| HPLMN | Home PLMN |
| HRPD | High Rate Packet Data |
| H-SLP | Home SLP |
| HSS | Home Subscriber Server |
| IE | Information Element |
| IoT | Internet of Things |
| IP | Internet Protocol |
| LI | Location Information |
| LPP | LTE Positioning Protocol |
| LPPa | LTE Positioning Protocol A |
| LPPe | LPP Extensions |
| LS | Location Server |
| LTE | Long Term Evolution |
| LTE-D | LTE Direct |
| LTE-M | LTE category M1 |
| MME | Mobility Management Entity |
| MTC | Machine Type Communications |
| NB-IoT | Narrow Band IoT |
| NR | New Radio |
| OMA | Open Mobile Alliance |
| OTDOA | Observed Time Difference Of Arrival |
| PLI | Provide Location Information |
| PLMN | Public Land Mobile Network |
| PRS | Positioning Reference Signal |
| QoS | Quality of Service |
| RAD | Request Assistance Data |
| RAT | Radio Access Type |
| RLI | Request Location Information |
| R-GMLC | Requesting GMLC |
| RSRP | Reference Signal Received Power |
| RSRQ | Reference Signal Received Quality |
| RSSI | Received Signal Strength Indication |
| RSTD | Reference Signal Time Difference |
| RTT | Round Trip signal propagation Time |
| SET | SUPL Enabled Terminal |
| SGW | Serving Gateway |
| SLP | SUPL Location Platform |
| SPS | Satellite Positioning System |
| S/N | Signal-to-Noise Ratio |
| SV | Space Vehicle |
| TDMA | Time Division Multiple Access |
| TS | Technical Specification |
| UE | User Equipment |
| UL | Uplink |
| UMTS | Universal Mobile Telecommunications Service |
| UP | User Plane |
| V-GMLC | Visited GMLC |
| VPLMN | Visited PLMN |
| WCDMA | Wideband CDMA |
| WLAN | Wireless Local Area Network |
| WPAN | Wireless Personal Area Network |
| WWAN | Wireless Wide Area Network |

It is further noted that embodiments are not limited to the use of the functionality provided by the abbreviations described above. Embodiments may utilize other functions, components, and/or designs, depending on desired functionality. Additionally, it can be noted that, although embodiments described herein refer to specific technologies and standards, such as Long Term Evolution (LTE) positioning protocol (LPP), a person of ordinary skill in the art will recognize that the techniques provided herein may be applied in to other technologies, standards, and/or wireless environments.

The $3^{rd}$ Generation Partnership Project (3GPP) has defined specifications that provide support for wireless communication involving Machine Type Communications (MTC), Internet of Things (IoT), Cellular IoT (CIoT), and Narrow Band IoT (NB-IoT). NB-IoT is a Radio Access Type (RAT), supported by the evolved Universal Mobile Telecommunications Service (UMTS) Terrestrial Radio Access Network (E-UTRAN), that was added by 3GPP in specifications for 3GPP Release 13 to provide 200 KHz UL/DL (Uplink/Downlink) carrier bandwidth (and 180 KHz UL/DL usable bandwidth). The CIoT concerns EPC (evolved packet core) support for NB-IoT, IoT and MTC and is complimentary to NB-IoT (e.g., NB-IoT is concerned with E-UTRAN and CIoT is concerned with the EPC).

For NB-IoT, restricted (e.g., 180 KHz) bandwidth, lower Signal to Noise Ratio (S/N) near cell edges and associated high message transfer delay (e.g., up to 7 seconds) may significantly limit the number and size of messages that can be transferred between a UE and a location server (LS) during a location session for the UE whereby a location or location estimate for the UE is obtained. For example, messages may be transferred between the LS and the UE during a location session according to an LTE Positioning Protocol (LPP) defined by 3GPP. However, current LPP may not be able to restrict a UE from sending many and/or large LPP messages containing location measurements or requesting large amounts of assistance data (AD) from an LS. Although an LS may restrict the amount of AD sent to a UE and the number of measurements requested from a UE, neither form of control may be efficient. For example, in the case of AD, an LS may not know which types of AD are more important to a UE, so the LS may send less important AD to a UE and not send more important AD. Similarly, if an LS restricts the number of measurements requested from a UE and the UE is not able to obtain all of or some of the requested measurements, an inaccurate location estimate or no location estimate at all may result. This problem may occur not only with NB-IoT radio access but in other bandwidth and/or signaling limited scenarios, such as with wireless wide area network (WWAN) and/or wireless local area network (WLAN) congestion, LTE direct (LTE-D) relaying (e.g. through a relay UE), or with a satellite link.

Techniques described herein, which relate generally to communication and more specifically to techniques for supporting location services for UEs, may address these and other issues by providing ways in which the quantity of signaling may be limited for an LPP location session or a location session using some other positioning protocol. For example, LPP may be enhanced to allow an LS to indicate to a UE a limit (e.g., number of octets) on the overall size of AD that the UE can request and/or a limit on the overall amount of location information (LI) that the UE can return. The limits may apply, for example, to the overall size of LPP messages at the LPP level and may be included as part of Common information elements (IEs) in an LPP Request Location Information message (RLI) sent to a UE. A recipient UE can then prioritize any request for AD such that more important AD should fit within the size limit. The recipient UE can also prioritize returned location measurements such that more useful measurements are included in an LPP Provide Location Information (PLI) message compliant to the limit indicated in the LPP RLI. An LS may determine suitable limits for AD and LI based on a requested quality of service (QoS), known characteristics (e.g., concerning available bandwidth and signaling transfer day) for a serving cell or serving RAT for a UE, and/or a priority of a location request. For example, higher limits might be assigned by an LS when: (i) the QoS requested by an external client for a location estimate for a UE indicates high location accuracy (e.g., 50 meters horizontal location error or less): (ii) a serving cell or serving RAT for the UE enables higher available bandwidth and/or lower signaling transfer delay for the UE; and/or (iii) a location request for the UE has high priority. Lower limits may also be assigned by an LS for the converse of these scenarios.

In the case of NB-IoT, a Mobility Management Entity (MME) may provide the serving cell coverage level (e.g. an expected S/N, expected message transfer delay, expected RTT, available bandwidth, RAT type and/or a coverage enhancement (CE) level) for a UE to an LS in a location request for the UE. For example, a CE level (also referred to as an enhanced coverage level) may be as defined in 3GPP TS 36.331, 36.413 and 36.321 and may include a numeric value (e.g. between 0 and 3) indicating a quality of coverage for a UE 102 such as an expected or allowed number of UL or DL transmission repetitions). In other cases, an LS may use Enhanced Cell ID (ECID) measurements provided by a UE (e.g., received signal strength indication (RSSI), reference signal received power (RSRP), reference signal received quality (RSRQ)) and/or measurements or estimates of round trip signal propagation time (RTT) at an LPP level, determined by the LS, to infer the available bandwidth and signaling transfer delay characteristics of a serving cell for a UE. The LS can then use the provided or inferred available bandwidth and signaling transfer delay to determine suitable limits for LPP message size and the size of AD and size of LI permitted for a UE in LPP messages.

It is noted that, although the description above and embodiments provided herein below may refer mainly to LPP, the techniques provided herein may be applied equally to location sessions using other positioning protocols such as the LPP Extensions (LPPe) protocol defined by the Open Mobile Alliance (OMA), a combination of LPP with LPPe (referred to as LPP/LPPe) or a New Radio (NR) Positioning Protocol (NPP or NRPP) defined for use with a UE that has NR or 5G wireless access.

FIG. 1 is a diagram illustrating a network architecture 100 for location support of a UE 102 that supports and is currently using NB-IoT radio access or LTE radio access with CIoT operational features, according to an embodiment, which may be used to implement the techniques for limiting the quantity of signaling described herein below. The network architecture 100 may be referred to as an Evolved Packet System (EPS). As illustrated, the network architecture 100 may include UE 102, an E-UTRAN 120, and an EPC 130. The E-UTRAN 120 and the EPC 130 may be part of a Visited Public Land Mobile Network (VPLMN) that is a serving network for UE 102 and communicates with a Home Public Land Mobile Network (HPLMN) 140 for UE 102. The VPLMN E-UTRAN 120, VPLMN EPC 130 and/or HPLMN 140 may interconnect with other networks. For example, the Internet may be used to carry messages to and from different networks such as the HPLMN 140 and the VPLMN EPC 130. For simplicity these networks and associated entities and interfaces are not shown. As shown, the network architecture 100 provides packet-switched services to UE 102. However, as those skilled in the art will readily appreciate, the various concepts presented throughout this disclosure may be extended to networks providing circuit-switched services.

The UE 102 may be any electronic device configured for NB-IoT, CIoT and/or LTE radio access. The UE 102 may be referred to as a device, a wireless device, a mobile terminal, a terminal, a mobile station (MS), a mobile device, a Secure User Plane Location (SUPL) Enabled Terminal (SET) or by some other name and may correspond to (or be part of) a smart watch, digital glasses or other head-mounted display, fitness monitor, smart car, smart appliance, cellphone, smartphone, laptop, tablet, personal digital assistant (PDA), personal media player, tracking device, control device, or some other portable or moveable device. A UE 102 may comprise a single entity or may comprise multiple entities such as in a personal area network where a user may employ audio, video and/or data I/O devices and/or body sensors and a separate wireline or wireless modem. Typically, though not necessarily, a UE 102 may support wireless communication with one or more types of WWAN such as a WWAN supporting Global System for Mobile Communications (GSM), Code Division Multiple Access (CDMA), Wideband CDMA (WCDMA), LTE, NB-IoT, Enhanced MTC (eMTC) also referred to as LTE category M1 (LTE-M), NR, High Rate Packet Data (HRPD), WiMax, etc. VPLMN EPC 130 combined with VPLMN E-UTRAN 120, and HPLMN 140, may be examples of a WWAN. A UE 102 may also support wireless communication with one or more types of Wireless Local Area Network (WLAN) such as a WLAN supporting IEEE 802.11 WiFi or Bluetooth® (BT). UE 102 may also support communication with one or more types of wireline network such as by using a Digital Subscriber Line (DSL), or packet cable for example. Although FIG. 1 shows only one UE 102, there may be many other UEs that can each correspond to UE 102.

The UE 102 may enter a connected state with a wireless communication network that may include the E-UTRAN 120 and EPC 130. In one example, UE 102 may communicate with a cellular communication network by transmitting wireless signals to, and/or receiving wireless signals from, a cellular transceiver, such as an evolved Node B (eNB) 104 in the E-UTRAN 120. The E-UTRAN 120 may include one or more additional eNBs 106. The eNB 104 provides user plane (UP) and control plane (CP) protocol terminations toward UE 102. The eNB 104 may be a serving eNB for UE 102 and may also be referred to as a base station, a base transceiver station, a radio base station, a radio transceiver, a radio network controller, a transceiver function, a base station subsystem (BSS), an extended service set (ESS), an NR NodeB (gNB) or by some other suitable terminology. The UE 102 also may transmit wireless signals to, or receive wireless signals from, a local transceiver (not shown in FIG. 1), such as an access point (AP), femtocell, Home Base Station, small cell base station, Home Node B (HNB) or Home eNodeB (HeNB), which may provide access to a WLAN (e.g., IEEE 802.11 network), a wireless personal area network (WPAN, e.g., Bluetooth network) or a cellular network (e.g., an LTE network or other wireless wide area network such as those discussed in the next paragraph). Of course it should be understood that these are merely examples of networks that may communicate with a mobile device over a wireless link, and claimed subject matter is not limited in this respect.

Examples of network technologies that may support wireless communication include NB-IoT, but may further include GSM, CDMA, WCDMA, LTE, NR, HRPD and eMTC radio types. NB-IoT, CIoT, GSM, WCDMA, LTE, eMTC and NR are technologies defined by (or expected to be defined by) 3GPP. CDMA and HRPD are technologies defined by the 3rd Generation Partnership Project 2 (3GPP2). WCDMA is also part of UMTS and may be supported by an HNB. Cellular transceivers, such as eNBs 104 and 106, may comprise deployments of equipment providing subscriber access to a wireless telecommunication network for a service (e.g., under a service contract). Here, a cellular transceiver may perform functions of a cellular base station in servicing subscriber devices within a cell determined based, at least in part, on a range at which the cellular transceiver is capable of providing access service.

The eNBs 104 and 106 are connected by an interface (e.g., the 3GPP S1 interface) to the VPLMN EPC 130. The EPC 130 includes a Mobility Management Entity (MME) 108, and a Serving Gateway (SGW) 112 through which data (e.g., Internet Protocol (IP) packets) to and from UE 102 may be transferred. The MME 108 may be the serving MME for UE 102 and is then the control node that processes the signaling between UE 102 and the EPC 130 and supports attachment and network connection of UE 102, mobility of UE 102 (e.g., via handover between network cells and tracking areas) as well as establishing and releasing data bearers on behalf of UE 102. The MME 108 may also support UP data transfer to and from UE 102 using a 3GPP CIoT feature known as CIoT CP optimization in which data packets are transferred to and from the UE via MME 108, rather than by bypassing MME 108, in order to avoid the overhead of establishing and releasing data bearers for UE 102. Generally, MME 108 provides bearer and connection management for UE 102 and may be connected to the SGW 112, the eNBs 104 and 106, an Enhanced Serving Mobile Location Center (E-SMLC) 110 and a Visited Gateway Mobile Location Center (V-GMLC) 116 in the VPLMN EPC 130.

The E-SMLC 110 may be an LS that supports location of UE 102 using the 3GPP control plane (CP) location solution defined in 3GPP technical specifications (TSs) 23.271 and 36.305 and may exchange LPP and/or LPP/LPPe messages with UE 102 as part of a CP location session. The V-GMLC 116, which may also be referred to simply as a Gateway Mobile Location Center (GMLC), may provide access on behalf of an external client (e.g., external client 150) or another network (e.g., HPLMN 140) to the location of UE 102. The external client 150 may be a web server or remote application that may have some association with UE 102 (e.g., may be accessed by a user of UE 102 via VPLMN E-UTRAN 120, VPLMN EPC 130 and HPLMN 140). The external client 150 may also be a server, application or computer system providing a location service to some other user or users which may include obtaining and providing the location of UE 102 (e.g., to enable a service such as friend or relative finder, asset tracking or child or pet location).

As illustrated, the HPLMN 140 includes a Home GMLC (H-GMLC) 148 that may be connected to the V-GMLC 116 (e.g., via the Internet), as well as a Packet Data Network Gateway (PDG) 114 that may be connected to the SGW 112 (e.g., via the Internet). The PDG 114 may provide UE 102 with Internet Protocol (IP) address allocation and IP and other data access to external networks (e.g., the Internet) and to external clients (e.g., external client 150) and external servers, as well as other data transfer related functions. In some cases, PDG 114 may be located in VPLMN EPC 130 and not in HPLMN 140 when UE 102 receives local IP breakout from VPLMN EPC 130. The PDG 114 may be connected to a location server (LS), such as a Home SUPL Location Platform (H-SLP) 118. The H-SLP 118 may support the SUPL UP location solution defined by OMA and may support location services for UE 102 based on subscription information for UE 102 stored in H-SLP 118. In some embodiments of network architecture 100, a Discovered SLP (D-SLP) or Emergency SLP (E-SLP) (not shown in FIG. 1), in or accessible from VPLMN EPC 130, may be used to locate UE 102 using the SUPL UP solution. H-SLP 118 and E-SMLC 110 in network architecture 100 are both examples of an LS that may employ the LPP and/or LPP/LPPe protocols for positioning of UE 102.

In a CP location solution, such as the 3GPP CP location solution defined in 3GPP TS 23.271 and TS 36.305, signaling (e.g. including LPP, LPP/LPPe and other messages) to support location of UE 102 may be transferred between participating entities (e.g. V-GMLC 116, MME 108, E-SMLC 110, eNB 104 and UE 102) using existing signaling interfaces and protocols for VPLMN EPC 130 and E-UTRAN 120. In contrast, in a UP location solution such as SUPL, signaling (e.g. such as SUPL messages carrying embedded LPP and/or LPP/LPPe messages) to support location of UE 102 may be transferred between participating entities (e.g. UE 102 and H-SLP 118) using data bearers (e.g. using the Internet Protocol (IP)).

The H-GMLC 148 may be connected to a Home Subscriber Server (HSS) 145 for UE 102, which is a central database that contains user-related and subscription-related information for UE 102. H-GMLC 148 may provide location access to UE 102 on behalf of external clients such as external client 150. One or more of H-GMLC 148, PDG 114, and H-SLP 118 may be connected to external client 150, e.g., through another network, such as the Internet. In some cases, a Requesting GMLC (R-GMLC) located in another PLMN (not shown in FIG. 1) may be connected to H-GMLC 148 (e.g., via the Internet) in order to provide location access to UE 102 on behalf of external clients connected to the R-GMLC. The R-GMLC, H-GMLC 148 and V-GMLC 116 may support location access to UE 102 using the 3GPP CP solution defined in 3GPP TS 23.271.

It should be understood that while a VPLMN (comprising VPLMN E-UTRAN 120 and VPLMN EPC 130) and a separate HPLMN 140 are illustrated in FIG. 1, both PLMNs (networks) may be the same PLMN. In that case, (i) H-SLP 118, PDG 114, and HSS 145 may be in the same network (EPC) as MME 108 and E-SMLC 110, and (ii) V-GMLC 116 and H-GMLC 148 may be the same GMLC.

In particular implementations, UE 102 may have circuitry and processing resources capable of obtaining location related measurements (also referred to as location measurements), such as measurements for signals received from GPS or other Satellite Positioning System (SPS) space vehicles (SVs) 160, measurements for cellular transceivers such as eNBs 104 and 106, and/or measurements for local transceivers. UE 102 may further have circuitry and processing resources capable of computing a position fix or estimated location of UE 102 based on these location related measurements. In some implementations, location related measurements obtained by UE 102 may be transferred to an LS, such as E-SMLC 110 or H-SLP 118, after which the LS may estimate or determine a location for UE 102 based on the measurements.

Location related measurements obtained by UE 102 may include measurements of signals received from SVs 160 belonging to an SPS or Global Navigation Satellite System (GNSS) such as GPS, GLONASS, Galileo or Beidou and/or may include measurements of signals received from terrestrial transmitters fixed at known locations (e.g., such as eNB 104, eNB 106 or other local transceivers). UE 102 or a separate LS (e.g., E-SMLC 110 or H-SLP 118) may then obtain a location estimate for UE 102 based on these location related measurements using any one of several position methods such as, for example, GNSS, Assisted GNSS (A-GNSS), Advanced Forward Link Trilateration (AFLT), Observed Time Difference Of Arrival (OTDOA), ECID, WLAN (also referred to as WiFi), or combinations thereof. In some of these techniques (e.g., A-GNSS, AFLT and OTDOA), pseudoranges or timing differences may be measured by UE 102 relative to three or more terrestrial transmitters fixed at known locations or relative to four or more SVs with accurately known orbital data, or combinations thereof, based at least in part, on pilot signals, navigation signals, positioning reference signals (PRS) or other positioning related signals transmitted by the transmitters or SVs and received at UE 102. Here, LSs, such as E-SMLC 110 or H-SLP 118, may be capable of providing positioning assistance data (AD) to UE 102 including, for example, information regarding signals to be measured by UE 102 (e.g., expected signal timing, signal coding, signal frequencies, signal Doppler), locations and/or identities of terrestrial transmitters and/or associated cell antennas, and/or signal, timing and orbital information for GNSS SVs to facilitate positioning techniques such as A-GNSS, AFLT, OTDOA, ECID and WLAN. The facilitation may include improving signal acquisition and measurement accuracy by UE 102 and/or, in some cases, enabling UE 102 to compute its estimated location based on the location measurements. For example, LSs may comprise an almanac (e.g., a Base Station Almanac (BSA)) which indicates the locations and identities of cellular transceivers and transmitters (e.g., eNBs 104 and 106) and/or local transceivers and transmitters in a particular region or regions such as a particular venue, and may further contain information descriptive of signals transmitted by these transceivers and transmitters such as signal power, signal timing, signal bandwidth, signal coding and/or signal frequency.

In the case of ECID, a UE 102 may obtain measurements of signal strength (e.g., RSSI or RSRP) for signals received from cellular transceivers (e.g., eNBs 104, 106) and/or local transceivers and/or may obtain an S/N, an RSRQ, and/or an RTT between UE 102 and a cellular transceiver (e.g., eNB 104 or 106) or a local transceiver. A UE 102 may transfer these measurements to an LS (e.g., E-SMLC 110 or H-SLP 118) to determine a location for UE 102, or in some implementations, UE 102 may use these measurements together with assistance data (e.g., terrestrial almanac data) received from an LS or from a cellular transceiver (e.g. eNB 104) to determine a location for UE 102 using ECID.

In the case of OTDOA, UE 102 may measure a Reference Signal Time Difference (RSTD) between signals, such as a Position Reference Signal (PRS) and/or Cell specific Reference Signal (CRS), received from nearby transceivers or base stations (e.g., eNBs 104 and 106). An RSTD measurement may provide the time of arrival difference between signals (e.g., CRS or PRS) received at UE 102 from two different transceivers (e.g., an RSTD between signals received from eNB 104 and from eNB 106). The UE 102 may return the measured RSTDs to an LS (e.g., E-SMLC 110 or H-SLP 118) which may compute an estimated location for UE 102 based on known locations and known signal timing for the measured transceivers. In some implementations of OTDOA, the signals used for RSTD measurements (e.g., PRS or CRS signals) may be accurately synchronized by the transceivers or transmitters to a common universal time such as GPS time or coordinated universal time (UTC), e.g., using a GPS receiver at each transceiver or transmitter to accurately obtain the common universal time.

In the case of A-GNSS, a UE 102 may obtain measurements of Doppler, pseudorange, code phase and/or carrier phase for one more SVs 160 for one or more GNSSs. In the case of WLAN positioning, a UE 102 may obtain the identities of one or more visible WiFi APs and possibly measurements for beacon frames and/or other signals transmitted from visible WiFi APs, such as measurements of RSSI and/or RTT. As described above for ECID and OTDOA, these measurements may be transferred to an LS (e.g. E-SMLC 110 or H-SLP 118) to compute a location for UE 102 or UE 102 may compute the location itself based on AD (e.g. AD for SVs 160 or WLAN APs) received from an LS, cellular transceivers or from the transmitters themselves (e.g. from SVs 16). In some implementations hybrid combinations of two or more position methods may be used by an LS and UE 102 to obtain a location for UE 102.

Position methods such as A-GNSS, OTDOA, AFLT, ECID and WLAN, as described above, may be referred to as downlink (DL) position methods because they are supported by UEs such as UE 102 based on measurements by the UE of downlink signals transmitted from terrestrial transmitters (e.g., eNBs 104 and 106) and/or SPS SVs (e.g., SVs 160). In contrast, with an uplink (UL) position method, an entity on the network side (e.g., eNB 104 or eNB 106) may measure uplinks signals transmitted by a UE (e.g., UE 102) in order to obtain a location estimate for the UE. The measurements for an UL position method may then be transferred to an LS (e.g., E-SMLC 110) using the LPP Annex (LPPa) protocol defined by 3GPP in TS 35.455 in order to enable the LS to determine a location of the UE.

An estimate of a location of a UE 102 may be referred to as a location, location estimate, location fix, fix, position, position estimate or position fix, and may be geodetic, thereby providing location coordinates for UE 102 (e.g., latitude and longitude) which may or may not include an altitude component (e.g., height above sea level, height above or depth below ground level, floor level or basement level). Alternatively, a location of UE 102 may be expressed as a civic location (e.g., as a postal address or the designation of some point or small area in a building such as a particular room or floor). A location of a UE 102 may also include an uncertainty and may then be expressed as an area or volume (defined either geodetically or in civic form) within which UE 102 is expected to be located with some given or default probability or confidence level (e.g., 67% or 95%). A location of a UE 102 may further be an absolute location (e.g., defined in terms of a latitude, longitude and possibly altitude and/or uncertainty) or may be a relative location comprising, for example, a distance and direction or relative X, Y (and Z) coordinates defined relative to some origin at a known absolute location. In the description contained herein, the use of the term location may comprise any of these variants unless indicated otherwise. Measurements (e.g., obtained by UE 102 or by another entity such as eNB 104) that are used to determine (e.g., calculate) a location estimate for UE 102 may be referred to as measurements, location measurements, location related measurements, positioning measurements or position measurements and the act of determining a location for UE 102 may be referred to as positioning of UE 102 or locating UE 102.

For downlink position methods and possibly for some uplink position methods, a UE 102 and a LS (e.g., E-SMLC 110 or H-SLP 118) may need to exchange positioning protocol messages, such as messages for LPP, LPP/LPPe or some other positioning protocol. However, for a UE 102 with NB-IoT access, messages may need to be transmitted multiple times in an UL and/or DL direction to ensure error free reception when S/N and an associated coverage enhancement (CE) level (e.g. as with a CE level of 2) are poor. Combined with a higher message transmission delay caused by limited bandwidth (e.g. with an NB-IoT bandwidth of only 180 KHz), this may lead to very long message transfer times (e.g. of several seconds) which may limit both the number and size of positioning protocol messages which can be exchanged between a UE 102 and an LS (e.g. E-SMLC 110 or H-SLP 118) during a location session. Because AD provided by the LS and/or LI provided by UE 102 (or, more generally, the downlink (DL) information provided by the LS and/or the uplink (UL) information provided by the UE) in a location session can comprise several hundred or even several thousand octets, devices may not be able to provide or enable a position fix in cases where a position is requested more frequently or with a lower delay requirement than a location is able to be determined in view of the transmission delays. In addition, the network bandwidth usage to obtain a location for a UE 102 with a poor NB-IoT coverage level and UE 102 resources (e.g., UE 102 battery) needed to obtain the location may need to be limited, leading to a need to limit the amount of AD and/or LI for positioning of UE 102. Thus, as previously indicated, techniques provided herein allow for an LS to specify a quantity of signaling of DL and/or UL information communicated in a location session where a UE 102 has narrow bandwidth wireless access (e.g., where UE 102 has NB-IoT access, a bandwidth between UE 102 and an LS is below a bandwidth threshold, an error rate is above an error rate threshold, etc.). The limitation of signaling in this manner may allow the location session to proceed where the narrow bandwidth wireless access may otherwise prevent the location session from successfully providing an accurate enough position fix or lead to excessive resource usage by the network and/or UE 102.

The term "quantity of signaling" as used herein may refer to an overall size of signaling information such as the number of octets in one signaling message or in a number of signaling messages. The term "quantity of signaling" may also refer to the amount of signaling information (e.g., number of octets) sent during some time interval (e.g., 1 second or 1 minute). The term "quantity of signaling" may also be referred to as a "volume of signaling", "signaling volume", "signaling quantity" or by some other name. In the case of positioning protocols like LPP and LPPe, a quantity of signaling may refer to one or more limits for LPP or LPP/LPPe messages or the content of LPP or LPP/LPPe messages. These limits may include a limit on: (i) the overall size of an UL or DL LPP or LPP/LPPe message; (ii) the overall size an UL LPP or LPP/LPPe message; (iii) the overall size of a DL LPP or LPP/LPPe message; (iv) the overall size of AD sent by an LS to a UE; (v) the overall size of location information (LI) sent by a UE to an LS; and/or (vi) the overall combined size of AD sent by an LS to a UE and LI sent by the UE to the LS. With regard to each of these limits, the term "size" may be synonymous with the term "amount" and may refer to a number of bits, a number of octets or to some other unit of information quantity and may refer to the size of the content of LPP and LPP/LPPe messages (e.g., the amount of AD or LI in an LPP or LPP/LPPe message) or the size of the LPP and LPP/LPPe messages themselves including message content (e.g. AD or LI), LPP or LPP/LPPe protocol header and control information and/or other protocol content such as message headers for transport protocols like the TCP and IP protocols. One or more of these limits may be sent to a UE (e.g. UE 102) by an LS (e.g., E-SMLC 110 or H-SLP 118) in order to limit the amount of AD the UE may request from the LS and/or the amount of LI the UE may send to the LS.

The network architecture 100 shown in FIG. 1 may apply to UE 102 wireless access using LTE or NB-IoT to VPLMN E-UTRAN 120 and VPLMN EPC 130. However, other similar network architectures may exist in which a UE 102 accesses other types of radio access network (RAN) and/or other types of core network. For example, when UE 102 uses an NR RAT, UE 102 may access a Next Generation RAN (NG-RAN) and a 5G Core Network (5GC) which may replace E-UTRAN 120 and EPC 130, respectively, in network architecture 100. In this case, some network elements for EPC 130 shown in FIG. 1 may be different. For example, MME 108 may be replaced by an Access and Mobility Management Function (AMF) and E-SMLC 110 may be replaced by an LS supporting a CP location solution for NR wireless access such as a Location Management Function (LMF). In the description of the various techniques below, it may therefore be possible to substitute an AMF for MME 108 and an LMF for E-SMLC 110 in examples where UE 108 has NR RAT access rather than NB-IoT or LTE RAT access.

Figure 2:
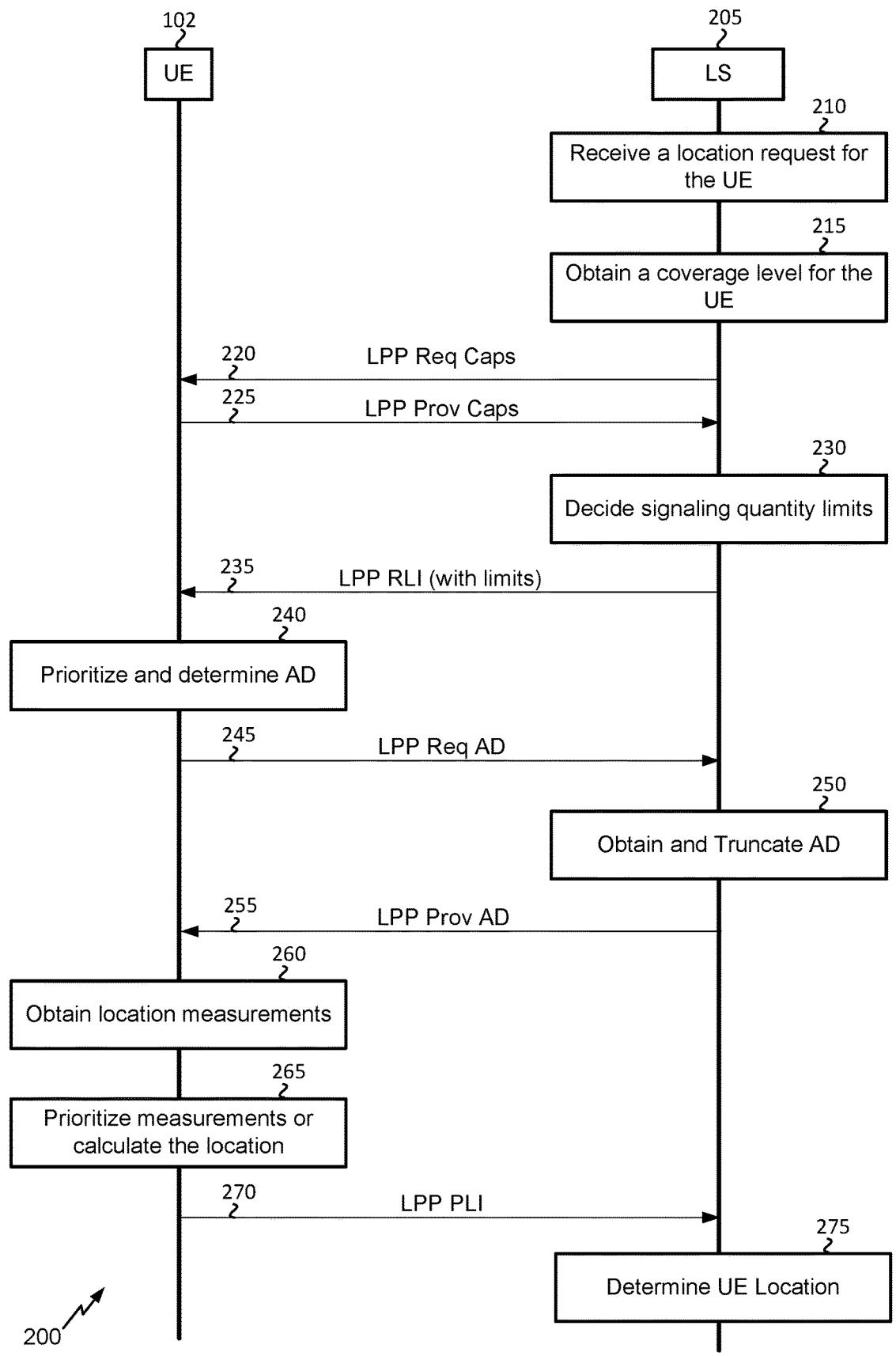
FIG. 2 is a signaling flow diagram of a location session between a UE and a location server (LS), illustrating how a quantity of signaling may be specified, according to an embodiment.

FIG. 2 is a diagram of a signaling flow 200 for a location session between a UE 102 and an LS 205 (e.g., an E-SMLC such as E-SMLC 110, an SLP such as H-SLP 118 or an LMF), illustrating how a quantity of signaling may be specified, according to an embodiment. It will be understood, however, that embodiments are not so limited. For example, although FIG. 2 assumes use of LPP for messages 220, 225, 235, 245, 255 and 270, use of other positioning protocols such as LPPe, LPP/LPPe or NPP (or NRPP) is also possible.

Although not shown in FIG. 2, the exchange of positioning protocol messages in FIG. 2 may occur as part of a location session for a CP location solution (e.g. the 3GPP CP location solution for LTE access defined in 3GPP TS 23.271 and 36.305) or as part of a location session for a UP location solution (e.g. the OMA SUPL location solution). In the case of a CP location solution, the LPP messages 220, 225, 235, 245, 255 and 270 described below may be transferred between LS 205 and UE 102 via intermediate entities such as MME 108 and eNB 104 in the case of network architecture 100 and using transport protocols such as a Non-Access Stratum Protocol (NAS), an S1 Application Protocol (S1AP), a Location Services (LCS) Application Protocol (LCS-AP) and a Radio Resource Control (RRC) protocol. In the case of a SUPL UP location solution, the LPP messages 220, 225, 235, 245, 255 and 270 described below may be transferred between LS 205 and UE 102 using IP data transfer and with a transport protocol such as the Transmission Control Protocol (TCP). For example, the transfer may be via PDG 114, SGW 112 and eNB 104 in the case that LS 205 corresponds to H-SLP 118 in network architecture 100. Further, when SUPL is used, each of the LPP messages 220, 225, 235, 245, 255 and 270 described below may be embedded inside a SUPL message such as a SUPL POS message.

Signaling flow 200 may start at block 210, where LS 205 receives a location request for UE 102. This location request may be received in any of a variety of manners, as a person of ordinary skill in the art will appreciate. For example, UE 102 may send a message to LS 205 that may prompt a location session with LS 205. This message may be triggered by an application executed by UE 102 (e.g., a navigation application), which may request a location estimate of the 102. In other scenarios, the location request may be originated by LS 205 or may be received from an external client (e.g., external client 150) either directly or via one or more other entities (e.g., GMLC 116, H-GMLC 148, MME 108).

At block 215, the coverage level for UE 102 may be obtained by LS 205. The coverage level may comprise one or more of an S/N, a message transfer delay, an RTT, an available bandwidth (e.g. 200 KHz for NB-IoT, 1.4 MHz for eMTC or 1.4, 5, 10 or 20 MHz for LTE), a RAT type (e.g. NB-IoT or LTE) and/or a coverage enhancement (CE) level (e.g. a numeric value of 0, 1, 2 or 3). For example, LS 205 may receive the coverage level as part of the location request received at block 210 (e.g., from MME 108 or from an AMF). In another example, LS 205 may receive information indicative of a coverage level from UE 102 (e.g. such as a RAT type, available bandwidth or CE level). In some embodiments, LS 205 may obtain or infer a coverage level for UE 102 by requesting a coverage level and/or location information directly from UE 102 (e.g., using LPP or LPP/LPPe) or from an eNB serving UE 102 (e.g., eNB 104) (e.g., using LPPa). For example, location information may include measurements made by UE 102 or by a serving eNB (e.g., eNB 104) such as measurements of RSSI, RSRP, RTT and/or RSRQ, from which LS 205 may infer a coverage level for UE 102. In another embodiment, LS 205 may estimate an RTT at the positioning protocol level between LS 205 and UE 102 from the time difference between sending a message to UE 102 (e.g. the message 220 described below) and receiving a response to this message from UE 102 (e.g. the message 225 described below) and may use the RTT to help infer a coverage level or as part of a coverage level. Block 215 may involve additional communication between LS 205 and one or more other entities such as UE 102 and/or eNB 104 (not shown in FIG. 2).

LS 205 may then, as part of the location session, send to UE 102 an LPP Request Capabilities message 220, in which LS 205 requests the positioning capabilities of UE 102 including the position methods supported by UE 102 and, for each supported position method, an indication of the types of AD and types of LI that UE 102 is capable of using or providing. In response, UE 102 sends an LPP Provide Capabilities message 225, providing LS 205 with the position methods supported by UE 102 and, for each supported position method, an indication of the types of AD and/or types of LI that UE 102 is capable of using or providing.

At block 230, LS 205 decides the signaling quantity limits to be used in the location session based on the coverage level obtained at block 215. These limits can apply to any or all of the DL and/or UL information subsequently communicated in the location session including, but not limited to: (i) a limit on the total amount of AD sent by LS 205 to UE 102; (ii) a limit on the total amount of LI sent by UE 102 to LS 205; (iii) a limit on the total amount of AD sent by LS 205 to UE 102 plus LI sent by UE 102 to LS 205; (iv) a maximum LPP or LPP/LPPe message size sent by UE 102 to LS 205; and/or (v) a maximum LPP or LPP/LPPe message size sent by LS 205 to UE 102. A message size limit and a limit on the amount of AD and/or LI may be conveyed in any of a variety of ways, including an octet limit (e.g., on the message size, AD size or LI size).

LS 205 then sends an LPP RLI message 235 to UE 102 to request location measurements and/or a location estimate using one or more position methods indicated as supported by the UE in the LPP Provide Capabilities message 225. The LPP RLI message 235 may include an indication of the signaling quantity limits determined at block 230. In some embodiments, LS 205 may include in the LPP RLI message 235 a priority for different types of LI being requested in order to assist UE 102 in prioritizing LI later at block 265.

In an embodiment, LS 205 may send an LPP (or LPP/LPPe) Provide Assistance Data (PAD) message to UE 102 prior to sending the LPP RLI message 235 (not shown in FIG. 2). In this embodiment, the LPP PAD message may include AD that may assist UE 102 to perform block 260 as described further down. The PAD message may include an indication of the signaling quantity limits determined at block 230, in which case the LPP RLI message 235 may not include signaling quantity limits. In this embodiment, the AD included in the LPP PAD message may be excluded from (e.g. not counted towards) any signaling quantity limit included in the LPP PAD message for subsequent AD sent by the LS (e.g. as in LPP PAD message 255 described further down).

At block 240, UE 102 can prioritize and determine AD (or additional AD if a PAD message is received prior to the RLI message 235), that may be needed to obtain or help obtain the location measurements or location estimate requested in the LPP RLI message 235. UE 102 may use the signaling quantity limits provided in the LPP RLI message 235 (or in a prior LPP PAD message) (e.g., an AD size limit or a UL LPP message size limit) to prioritize the AD such that more important or more useful AD can be requested that is compliant to the signaling quantity limits received in the LPP RLI message 235 (or in a prior LPP PAD message). For example, the signaling quantity limits may prevent LS 205 from providing all the types of AD which UE 102 is capable of utilizing. UE 102 can then determine a "preferred subset of AD" which may be of most benefit to obtaining the requested location measurements or determining a location fix, and send an LPP Request Assistance Data (RAD), message 245, to request the preferred subset of AD. As an example, the preferred subset of AD may include only types of AD with a highest priority. UE 102 may determine types of AD with a highest priority because UE 102 may know the likely size of each type of AD, and may therefore be able to determine the types of AD LS 205 may be able to provide compliant to any signaling quantity limits that may apply to AD provided by LS 205. As an example, if UE 102 requests AD for the A-GNSS position method, UE 102 may prioritize AD for only one or a few preferred GNSS (or GNSSs) and/or may prioritize only certain types of AD such as acquisition assistance data but not ephemeris data. Alternatively, the LPP RAD message 245 may include an indication of some or all types of AD the UE is capable of using, each with a priority. With this alternative, LS 205 may respond to the LPP RAD message 245 based on the priorities indicated therein (e.g., starting first with the highest priority AD) and whether the actual size of the corresponding types of AD can be compliant with the signaling quantity limits determined at block 230.

In some embodiments, UE 102 may prioritize and determine AD at block 240 based on utilizing AD already available to UE 102. For example, in a particular instance, for the A-GNSS position method, UE 102 may be able to utilize AD that includes ephemeral/orbital data, timing information for each GNSS constellation, an expected Doppler shift for each SV, and more. However, if UE 102 already has orbital data, it may prioritize other types of AD, including other types of GNSS AD. This prioritization may be reflected in the LPP RAD message 245, which may omit a request for A-GNSS orbital data AD or indicate that A-GNSS orbital data AD has a relatively low priority compared with other types of requested AD.

At block 250, LS 205 may obtain the AD (e.g. from local storage or from a database or reference network) that was requested by UE 102 in the LPP RAD message 245. As part of obtaining the AD, LS 205 may truncate or otherwise filter or reduce the AD, if needed, to comply with applicable signaling quantity limits, such as the signaling quantity limits determined at block 230 and/or the signaling quantity limits sent to UE 102 in the LPP RLI message 235. As previously indicated, signaling quantity limits may apply only to UL information (e.g. LI) provided by UE 102, in which case LS 205 may not need to truncate the AD. In some instances, LS 205 may additionally or alternatively have a limited amount of AD, in which case the AD may not need to be truncated even when DL signaling quantity limits apply. Furthermore, as previously indicated, UE 102 may, in view of the signaling quantity limits, restrict the types and amounts of AD requested in the LPP RAD message 245 such that the corresponding AD provided by LS 205 may not exceed the signaling quantity limits. However, in instances where the AD may otherwise exceed the signaling quantity limits imposed on the AD, LS 205 may truncate the AD provided to UE 102 in the manner described above, which may be based on a priority of the types of AD as indicated in the LPP RAD message 245 or may be based on the priority or importance of the AD or the position method(s) supported by the AD as seen by LS 205. The AD is then provided by LS 205 to UE 102 in an LPP Provide Assistance Data (PAD) message 255.

In some embodiments, blocks 240 and 250 are not performed and messages 245 and 255 are not sent—e.g. if UE 102 receives a PAD message with needed AD from LS 205 prior to message 235 as described previously or is otherwise able to obtain location measurements at block 260 as described next without additional AD.

In response to receiving the AD in the LPP PAD message 255 or based on AD already in possession of UE 102 (e.g. received in a PAD message prior to message 235), UE 102 obtains location measurements at block 260. The location measurements may comprise measurements requested in the LPP RLI message 235 or measurements needed to obtain a location estimate requested in the LPP RLI message 235. The location measurements obtained at block 260 may further be location measurements supported by UE 102 either without AD or using AD previously available to or previously received by UE 102 or provided to UE 102 in the LPP PAD message 255.

At block 265, UE 102 may determine LI to be returned to LS 205 by prioritizing the location measurements obtained at block 260 or may calculate a location estimate using the location measurements obtained at block 260. For example, UE 102 may prioritize location measurements by truncating location measurement data, if needed, based on an applicable signaling quantity limit for UL data (e.g. a limit for LI size or a limit for an UL LPP message size) provided by LS 205 in the LPP RLI message 235. UE 102 may do this in any of a variety of ways, depending on desired functionality. In one embodiment, for example, UE 102 may obtain a full set of location measurements as if no signaling quantity limits applied. UE 102 may then prioritize the obtained measurements. For example, prioritization by UE 102 may be based on the accuracy of each location measurement or the accuracy of the associated position method, with more accurate measurements or measurements for more accurate position methods being assigned a higher priority. UE 102 may then truncate or remove measurements with the lowest priority (or lowest priorities) to enable the remaining measurements to comply with the UL signaling quantity limit(s). In another embodiment, UE 102 may stop obtaining location measurements once location measurements have been obtained that just attain or slightly exceed the quantity permitted by the signaling quantity limit(s) received in the LPP RLI message 235. In this embodiment, UE 102 may further prioritize location measurements (e.g. based on expected accuracy or expected accuracy of an associated position method) prior to and/or while obtaining the location measurements at block 260. For example, location measurements obtained initially at block 260 may indicate a likely accuracy for other similar location measurements not yet obtained by UE 102 at block 260. In other embodiments, UE 102 may use some or all of the location measurements obtained at block 260 to calculate a location estimate at block 265 if the obtained location measurements would otherwise need to be truncated at block 265 to comply with the signaling quantity limit(s) received in the LPP RLI message 235. Obtaining a location estimate may reduce the size of LI that may need to be returned by UE 102 to LS 205, in comparison to the size of the location measurements used to obtain the location estimate, and may enable UE 102 to comply with the UL signaling quantity limit(s) received in the LPP RLI message 235.

Following prioritization of the location measurements or obtaining a location estimate at block 265, UE 102 sends the location measurements or location estimate to LS 205 in an LPP PLI message 270. For example, UE 102 may only include higher priority location measurements in the LPP PLI message 270 that comply with the UL signaling quantity limit(s) received in the LPP RLI message 235.

At block 275, LS 205 may determine (or verify) a location for UE 102 using the location measurements or location estimate received in the LPP PLI message 270. LS 205 may then provide the determined (or verified) location to the entity that sent the location request received at block 210 such as the external client 150 (not shown in FIG. 2).

Figure 3:
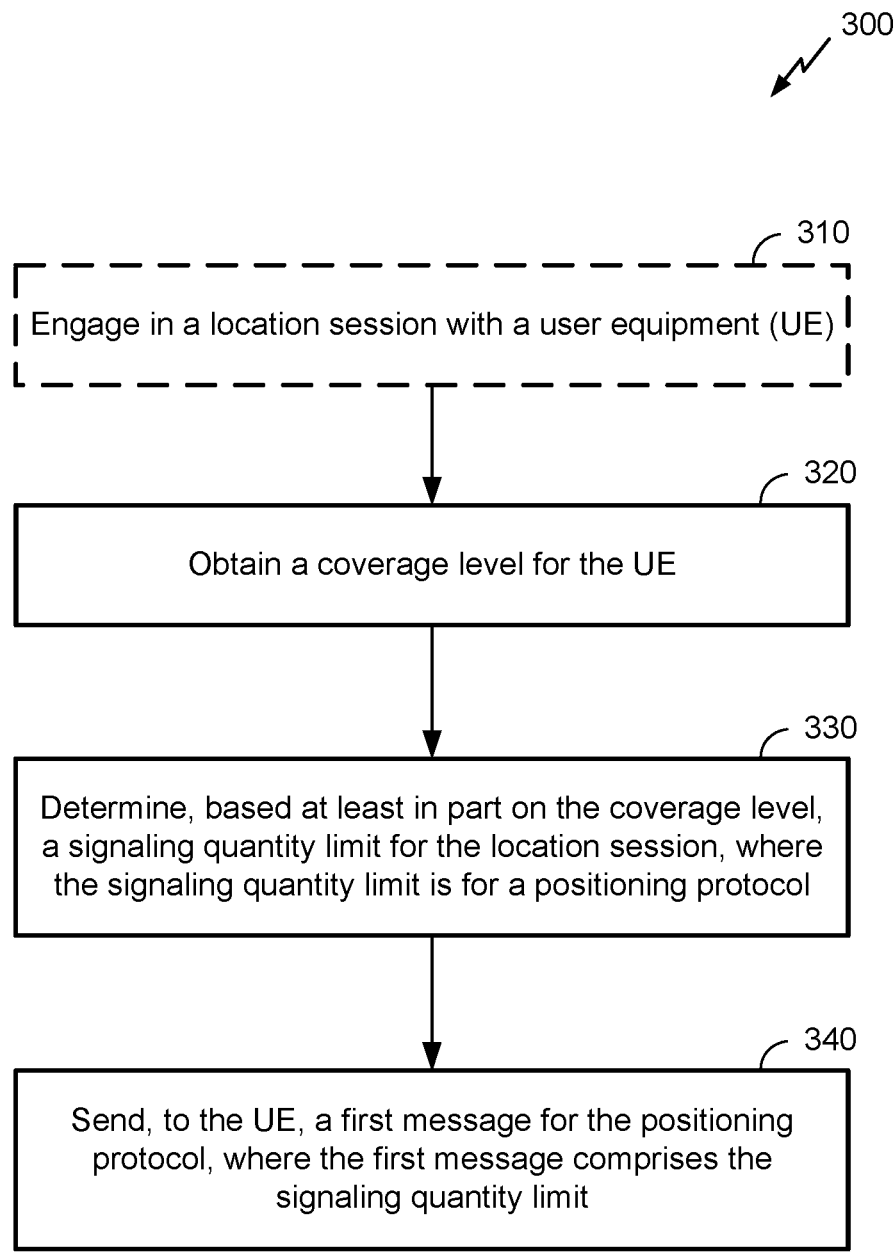
FIG. 3 is a process flow diagram of a method at an LS for limiting the quantity of signaling for a location session using a Long Term Evolution (LTE) positioning protocol (LPP) or LPP Extensions (LPPe) positioning protocol, according to an embodiment.

FIG. 3 is a process flow diagram 300 of a method performed at an LS (e.g. E-SMLC 110, H-SLP 118, LS 205 or an LMF) for limiting the quantity of signaling for a location session with a UE (e.g. UE 102), according to an embodiment. As with other figures appended hereto, FIG. 3 is provided as a non-limiting example. Alternative embodiments may add, omit, combine, rearrange, separate, and/or otherwise alter the functions as illustrated in FIG. 3, while limiting the quantity of signaling for an LPP or LPP/LPPe location session in the manner described herein. Means for performing the functionality described in one or more of the blocks in FIG. 3 can include software and/or hardware components of a computer system, such as the computer system 600 illustrated in FIG. 6 and described in more detail below.

Figure 6:
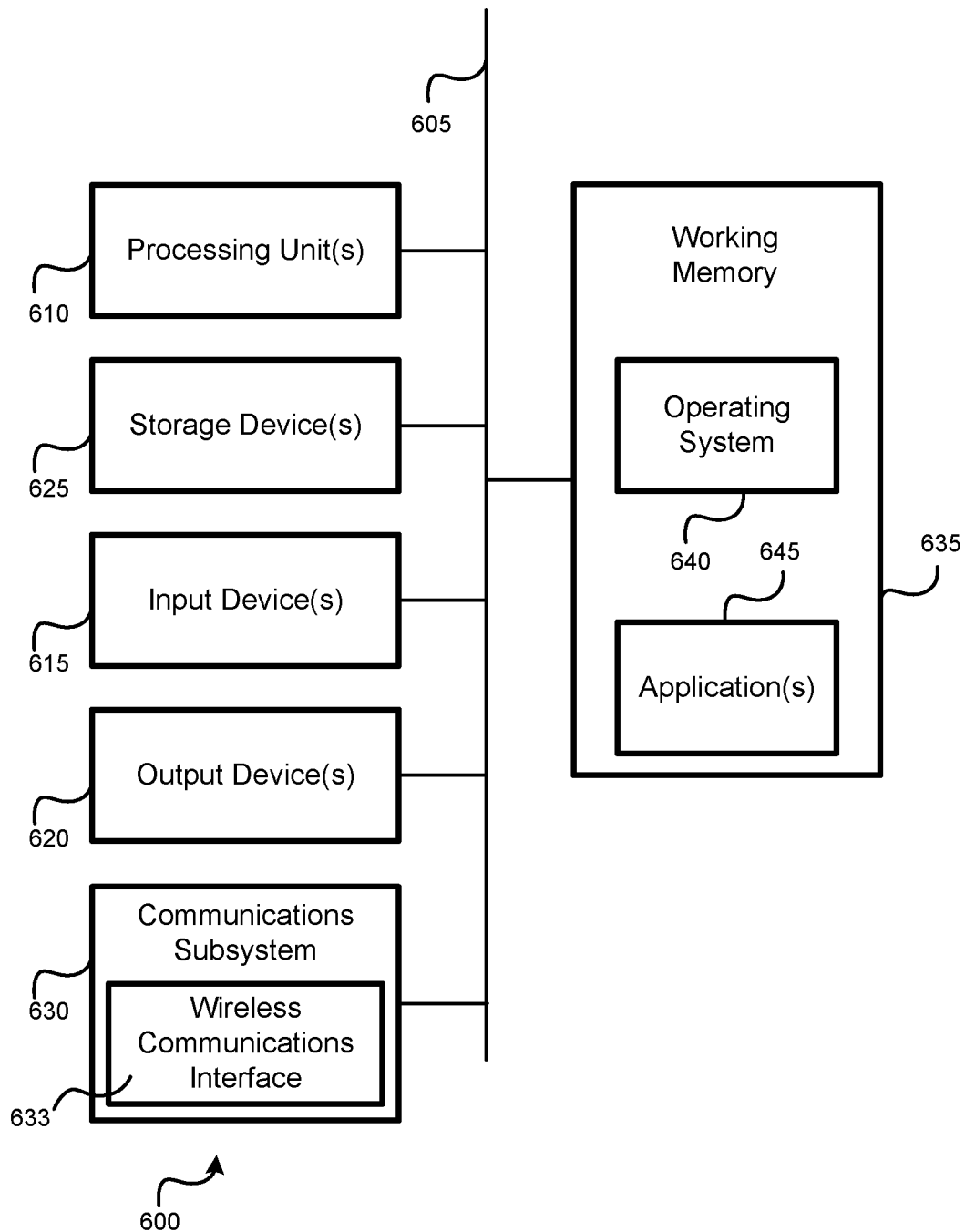
FIG. 6 is a block diagram of a computer system.

The method can begin at block 310, where the LS can optionally engage in location session with a UE (e.g. UE 102). For example, the location session may correspond to the location session exemplified in signaling flow 200 and may be a location session for a control plane location solution (e.g. a 3GPP control plane location solution) or a user plane location solution (e.g. the OMA SUPL location solution). As a person of ordinary skill in the art will appreciate, a location session (e.g., a UP or CP location session) may be initiated by the LS or by the UE, in response to a variety of triggering events. As previously indicated, in some embodiments the LS may comprise, for example, an E-SMLC (e.g. E-SMLC 110), an SLP (e.g. H-SLP 118) or an LMF. In some embodiments (where the functionality at block 310 is not performed), some or all of the functionality of the subsequent blocks may be performed outside of a location session. Means for performing the functionality described in block 310 can include, for example, bus 605, processing unit(s) 610, communications subsystem 630, wireless communications interface 633, working memory 635, operating system 640, application(s) 645, and/or other components of a computer system 600 as illustrated in FIG. 6 and described in more detail below.

At block 320, the LS obtains a coverage level for the UE. As indicated in the embodiments described above, this information can be obtained implicitly or explicitly, for example, via a message exchange between the LS and the UE or in a location request (e.g. from an MME such as MME 108). In other embodiments, the LS may infer a coverage level from location measurements obtained for the UE such as location measurements provided by the UE (e.g. such as measurements for ECID) or obtained for the UE (e.g. such as an RTT measured by the LS). In an aspect, the coverage level may comprise at least one of an S/N, a message transfer delay, an RTT, an available bandwidth, a RAT, a CE level, or some combination of these. In this aspect, the RAT may comprise an NB-IoT RAT or an LTE RAT. In some embodiments, block 320 may correspond to block 215 in signaling flow 200. Means for performing the functionality described in block 320 can include, for example, bus 605, processing unit(s) 610, communications subsystem 630, wireless communications interface 633, working memory 635, operating system 640, application(s) 645, and/or other components of a computer system 600 as illustrated in FIG. 6 and described in more detail below.

At block 330, a signaling quantity limit for the location session is determined, based at least in part on the coverage level, where the signaling quantity limit is for a positioning protocol such as LPP, LPPe, LPP/LPPe or NPP. The determination of the signaling quantity limit may be made using any of a variety of known factors including, for example, the coverage level, UE access type, QoS, priority of the location request, and the like. (In the case of an emergency call, the LS may choose to ignore the limits.) In some embodiments, block 330 may correspond to block 230 in signaling flow 200. Means for performing the functionality described in block 330 can include, for example, bus 605, processing unit(s) 610, working memory 635, operating system 640, application(s) 645, and/or other components of a computer system 600 as illustrated in FIG. 6 and described in more detail below.

Depending on desired functionality, the signaling quantity limit may apply to DL information provided by the LS to the UE and/or UL information provided by the UE to the UE. In some instances, the signaling quantity limit may apply specifically to AD sent by the LS to the UE and/or to LI sent by the UE to the LS. In other instances, the signaling quantity limit may apply more generally to one or more UL and/or DL messages for the positioning protocol transferred between the UE and the LS. As previously indicated, the signaling quantity limit may comprise, for example, a limit on the total amount of AD sent by the LS to the UE, a limit on the total amount of LI sent by the UE to the LS, a limit on the total amount of AD sent by the LS to the UE plus LI sent by the UE to the LS, a maximum message size for the positioning protocol sent by the UE to the LS, or a maximum message size for the positioning protocol sent by the LS to the UE, or any combination thereof.

At block 340, a first message for the positioning protocol is sent to the UE, where the first message comprises the signaling quantity limit. In some embodiments, for example, the first message may comprise an LPP or LPP/LPPe RLI message. In some embodiments, the first message may correspond to LPP RLI message 235 in signaling flow 200. Means for performing the functionality described in block 340 can include, for example, bus 605, processing unit(s) 610, communications subsystem 630, wireless communications interface 633, working memory 635, operating system 640, application(s) 645, and/or other components of a computer system 600 as illustrated in FIG. 6 and described in more detail below.

Depending on desired functionality, embodiments may provide for additional messages to be communicated. For example, in some embodiments, the LS may receive, from the UE, a second message for the positioning protocol, where the second message comprises a request for AD. In response to receiving the second message, the LS may send a third message for the positioning protocol to the UE, where the third message comprises the requested AD and where the third message satisfies the signaling quantity limit. For example, in some embodiments, the second message may be an LPP or LPP/LPPe RAD message (e.g. corresponding to LPP RAD message 245 in signaling flow 200) and the third message may be an LPP or LPP/LPPe PAD message (e.g. corresponding to LPP PAD message 255 in signaling flow 200).

In some embodiments, the LS may receive, from the UE, a second message for the positioning protocol, where the second message comprises LI, and where the amount of LI may satisfy the signaling quantity limit. For example, the LI may comprise location measurements or a calculated location requested by the LS in the first message. In some embodiments, the second message may be an LPP or LPP/LPPe PLI message (e.g. corresponding to LPP PLI message 270 in signaling flow 200) and/or may be in response to the first message.

Figure 4:
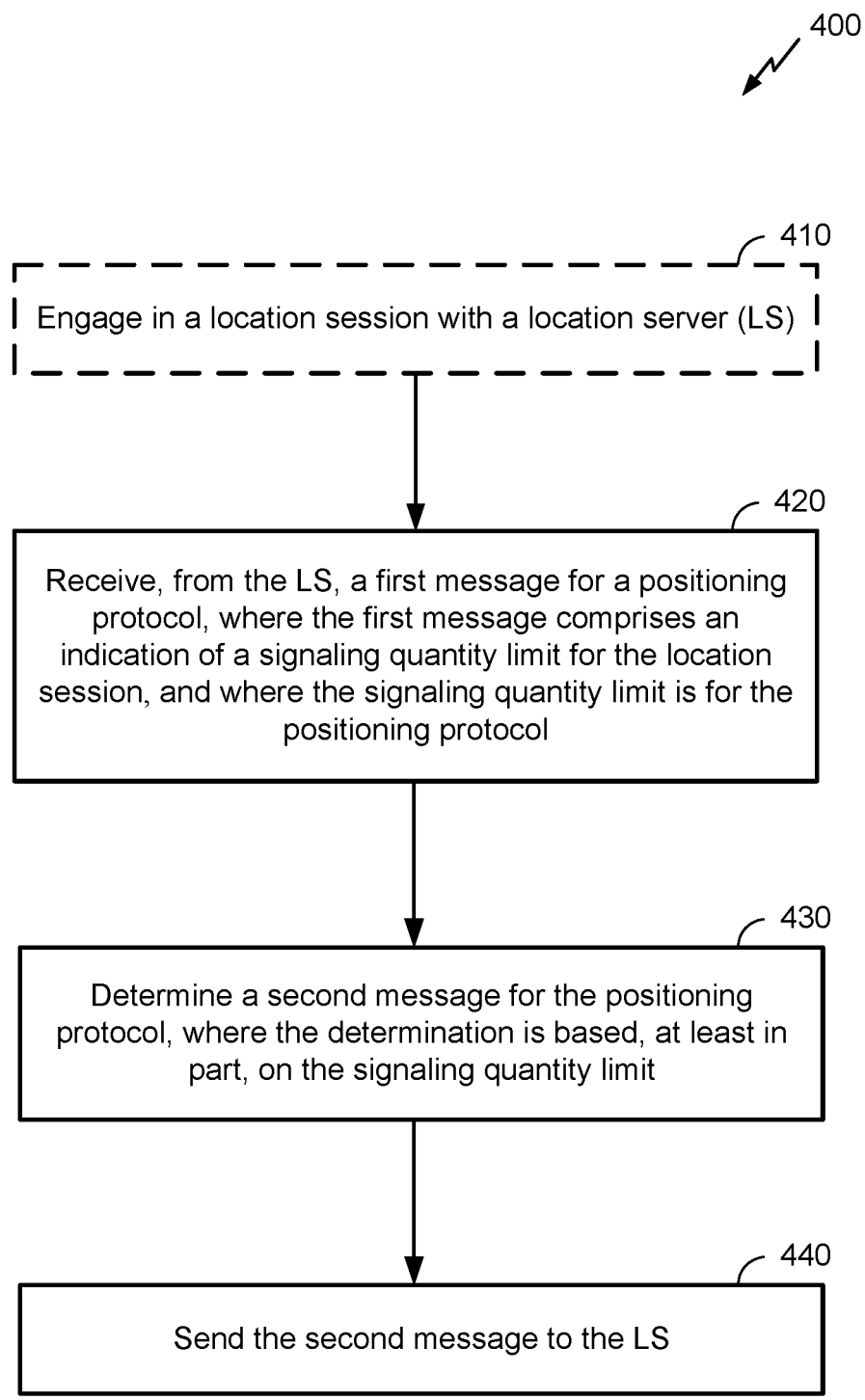
FIG. 4 is a process flow diagram of a method at a UE for limiting the quantity of signaling for a location session using an LPP or LPPe positioning protocol, according to an embodiment.

FIG. 4 is a process flow diagram 400 of a method performed at a UE (e.g. UE 102) for limiting the quantity of signaling for a location session with an LS, according to an embodiment. Alternative embodiments may add, omit, combine, rearrange, separate, and/or otherwise alter the functions as illustrated in FIG. 4, while limiting the quantity of signaling for a location session in the manner described herein. Means for performing the functionality described in one or more of the blocks in FIG. 4 can include software and/or hardware components of a computer system, such as the UE 102 illustrated in FIG. 5 and described in more detail below.

Figure 5:
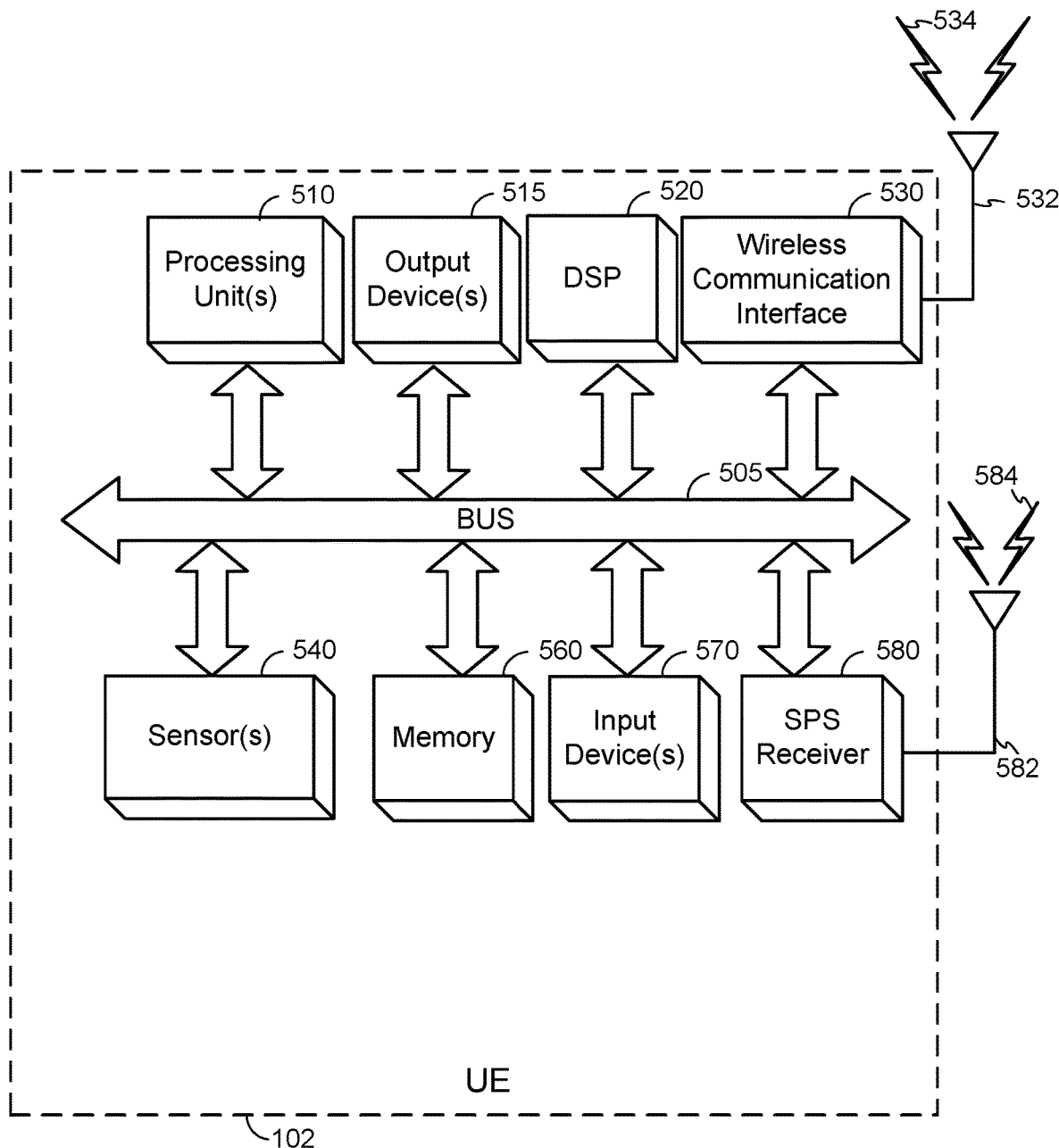
FIG. 5 is a block diagram of a UE.

The method can begin at block 410, where the UE can optionally engage in a location session with an LS. For example, the location session may correspond to the location session exemplified in signaling flow 200 and may be a location session for a control plane location solution (e.g. a 3GPP control plane location solution) or a user plane location solution (e.g. the OMA SUPL location solution). The LS may comprise, for example, an E-SMLC (e.g. E-SMLC 110), an SLP (e.g. H-SLP 118) or an LMF. As indicated previously, the location session may be initiated by the LS or by the UE, in response to a variety of triggering events. In some embodiments the UE may comprise any of a variety of electronic devices including, for example, a mobile telephone, cellphone or smartphone. In some embodiments (where the functionality at block 410 is not performed), some or all of the functionality of the subsequent blocks may be performed outside of a location session. Means for performing the functionality described in block 410 can include, for example, bus 505, processing unit(s) 510, wireless communication interface 530, wireless communication antenna(s) 532, memory 560, and/or other components of a UE 102 as illustrated in FIG. 5 and described in more detail below.

At block 420, a first message for a positioning protocol is received from the LS, where the first message comprises an indication of a signaling quantity limit for the location session, and where the signaling quantity limit is for the positioning protocol. As an example, the positioning protocol may be LPP, LPPe, LPP/LPPe or NPP. As previously explained in length, the signaling quantity limit can apply to subsequently-communicated AD, LI, and/or UL and/or DL messages for the positioning protocol transferred between the UE and the LS. As previously indicated, the signaling quantity limit may comprise, for example, a limit on the total amount of AD sent by the LS to the UE, a limit on the total amount of LI sent by the UE to the LS, a limit on the total amount of AD sent by the LS to the UE plus LI sent by the UE to the LS, a maximum message size for the positioning protocol sent by the UE to the LS, or a maximum message size for the positioning protocol sent by the LS to the UE, or any combination thereof.

In some embodiments, the first message may be an LPP or LPP/LPPe RLI message and may correspond to LPP RLI message 235 in signaling flow 200. Means for performing the functionality described in block 420 can include, for example, bus 505, processing unit(s) 510, wireless communication interface 530, wireless communication antenna(s) 532, memory 560, and/or other components of a UE 102 as illustrated in FIG. 5 and described in more detail below.

At block 430, a second message for the positioning protocol is determined, where the determination is based at least in part on the signaling quantity limit. For example, the UE may limit the size of the second message, the size of some of the content of the second message (e.g. LI), and/or the size of data (e.g. AD) requested by the second message from the LS. At block 440, the LS sends the second message to the LS.

Means for performing the functionality described in blocks 430 and/or 440 can include, for example, bus 505, processing unit(s) 510, wireless communication interface 530, wireless communication antenna(s) 532, sensor(s) 540, memory 560, SPS receiver 580, SPS antenna 582, and/or other components of a UE 102 as illustrated in FIG. 5 and described in more detail below.

In one embodiment, determining the second message at block 430 comprises determining a type of AD to request from the LS, where the second message comprises a request for the determined type of AD. For example, as described previously, the UE may, in view of the signaling quantity limit, determine which types of AD to request and/or provide an indication of a priority of each of the requested types of AD. In this embodiment, block 430 may correspond to or include block 240 in signaling flow 200 and/or the second message may be an LPP or LPP/LPPe RAD and may correspond to LPP RAD 245 in signaling flow 200. In this embodiment, following block 440, the UE may receive, from the LS, a third message for the positioning protocol, where the third message comprises the determined type of AD or a subset of the determined type of AD (e.g. as requested in the second message). As an example, the third message may be an LPP or LPP/LPPe PAD message and may correspond to LPP PAD message 255 in signaling flow 200.

In another embodiment, determining the second message at block 430 comprises determining a type of LI to send to the LS, where the second message comprises the determined type of LI. For example, the UE may obtain LI (e.g. as requested by the LS in the first message and/or as at block 260 in signaling flow 200). The UE may then prioritize the obtained LI or may initially obtain LI and cease obtaining the LI once the obtained LI attains or exceeds the signaling quantity limit. The determined type of LI may comprises location measurements or a calculated location. In this embodiment, block 430 may correspond to or include block 265 in signaling flow 200.

FIG. 5 illustrates an embodiment of a UE 102, which can be utilized as described in the embodiments provided above and described in FIGS. 1-4. It should be noted that FIG. 5 is meant only to provide a generalized illustration of various components, any or all of which may be utilized as appropriate. In other words, because UEs can vary widely in functionality, they may include only a portion of the components shown in FIG. 5. It can be noted that, in some instances, components illustrated in FIG. 5 can be localized to a single physical device and/or distributed among various networked devices, which may be disposed at different physical locations.

The UE 102 is shown comprising hardware elements that can be electrically coupled via a bus 505 (or may otherwise be in communication, as appropriate). The hardware elements may include a processing unit(s) 510 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 5, some embodiments may have a separate DSP 520, depending on desired functionality. The UE 102 also may comprise one or more input devices 570, which may comprise without limitation one or more touch screens, touch pads, microphones, buttons, dials, switches, and/or the like; and one or more output devices 515, which may comprise without limitation, one or more displays, light emitting diode (LED)s, speakers, and/or the like.

The UE 102 may also include a wireless communication interface 530, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMax device, cellular communication facilities, etc.), and/or the like, which may enable UE 102 to communicate via the networks and RATs described above with regard to FIG. 1. The wireless communication interface 530 may permit data to be communicated with a network, an LS, wireless access points, wireless base stations, other computer systems, and/or any other electronic devices described herein. The communication can be carried out via one or more wireless communication antenna(s) 532 that send and/or receive wireless signals 534.

Depending on desired functionality, the wireless communication interface 530 may comprise separate transceivers to communicate with base stations (e.g., eNBs 104 and 106 of FIG. 1) and other terrestrial transceivers, such as wireless devices and access points, belonging to or associated with one or more wireless networks. These wireless networks may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) network, and so on. A CDMA network may implement one or more radio access technologies (RATs) such as cdma2000, Wideband CDMA (WCDMA), and so on. Cdma2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, NR and so on. LTE, LTE Advanced, NR, GSM, and WCDMA are described (or being described) in documents from 3GPP. Cdma 2000 is described in documents from a consortium named "3rd Generation Partnership Project 2" (3GPP 2). 3GPP and 3GPP2 documents are publicly available. A WLAN may also be an IEEE 802.11x network, and a WPAN may be a Bluetooth network, an IEEE 802.15x, or some other type of network. The techniques described herein may also be used for any combination of WWAN, WLAN and/or WPAN.

The UE 102 can further include sensor(s) 540. Such sensors may comprise, without limitation, one or more accelerometer(s), gyroscope(s), camera(s), magnetometer(s), altimeter(s), microphone(s), proximity sensor(s), light sensor(s), and the like. Some or all of the sensor(s) 540 can be utilized, among other things, for obtaining location measurements and/or obtaining other types of LI that may be communicated to an LS.

Embodiments of UE 102 may also include an SPS receiver 580 capable of receiving signals 584 from one or more SPS satellites using an SPS antenna 582, which may be combined with antenna(s) 532 in some implementations. Positioning of UE 102 using SPS receiver 580 may be utilized to complement and/or incorporate the techniques described herein, e.g. may be used to obtain LI by UE 102. The SPS receiver 580 may support measurement of signals from SPS SVs of an SPS system, such as a GNSS (e.g., Global Positioning System (GPS)), Galileo, GLONASS, Quasi-Zenith Satellite System (QZSS) over Japan, Indian Regional Navigational Satellite System (IRNSS) over India, Beidou over China, and/or the like. Moreover, the SPS receiver 580 may be used with various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The UE 102 may further include and/or be in communication with a memory 560. The memory 560 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. The memory 560 may be used, among other things, to store AD received from an LS using a database, linked list, or any other type of data structure. In some embodiments, wireless communication interface 530 may additionally or alternatively comprise memory.

The memory 560 of UE 102 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality for UE 102 discussed above might be implemented as code and/or instructions executable by UE 102 (and/or a processing unit within the UE 102). In an aspect, then, such code and/or instructions can be used to configure and/or adapt a general purpose computer (or other device) to perform one or more operations in accordance with the described methods.

FIG. 6 illustrates an embodiment of a computer system 600, which may be used, in whole or in part, to provide the functions of an LS as described in the embodiments above. The computer system 600 may correspond to E-SMLC 110 or H-SLP 118 in network architecture 100, to LS 205 in signaling flow 200 an/or to an LS performing the method of process flow diagram 300. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner. In addition, it can be noted that components illustrated in FIG. 6 can be localized to a single device and/or distributed among various networked devices, which may be disposed at different geographical locations.

The computer system 600 is shown comprising hardware elements that can be electrically coupled via a bus 605 (or may otherwise be in communication, as appropriate). The hardware elements may include processing unit(s) 610, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 600 also may comprise one or more input devices 615, which may comprise without limitation a mouse, a keyboard, a camera, a microphone, and/or the like; and one or more output devices 620, which may comprise without limitation a display device, a printer, and/or the like.

The computer system 600 may further include (and/or be in communication with) one or more non-transitory storage devices 625, which can comprise, without limitation, local and/or network accessible storage, and/or may comprise, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. Such data stores may include database(s) and/or other data structures used to store and administer messages and/or other information to be sent to one or more devices as described herein.

The computer system 600 may also include a communications subsystem 630, which may comprise wireless communication technologies managed and controlled by a wireless communication interface 633, as well as wired technologies (such as Ethernet, coaxial communications, universal serial bus (USB), and the like). The communications subsystem may comprise a modem, a network card (wireless or wired), an infrared communication device, a wireless communication device, and/or a chipset, and/or the like, which may enable the computer system 600 to communicate on any or all of the communication networks described herein to any device on or accessible from the respective network, including the UE 102, other computer systems, and/or any other electronic devices described herein. Hence, the communications subsystem 630 may be used to receive and send signaling and messages as described in the embodiments herein.

In many embodiments, the computer system 600 will further comprise a working memory 635, which may comprise a RAM or ROM device, as described above. Software elements, shown as being located within the working memory 635, may comprise an operating system 640, device drivers, executable libraries, and/or other code, such as one or more applications 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions may be used to configure and/or adapt a general purpose computer (or other device) to perform one or more operations in accordance with the described techniques.

A set of these instructions and/or code may be stored on a non-transitory computer-readable storage medium, such as the storage device(s) 625 described above. In some cases, the storage medium may be incorporated within a computer system, such as computer system 600. In other embodiments, the storage medium may be separate from a computer system (e.g., a removable medium, such as an optical disc), and/or provided in an installation package, such that the storage medium can be used to program, configure, and/or adapt a general purpose computer with the instructions/code stored thereon. These instructions may take the form of executable code, which is executable by the computer system 600 and/or may take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method at a location server (LS) for limiting a quantity of signaling for a location session with a user equipment (UE), the method comprising:

obtaining a coverage enhancement level for the UE;

determining, based at least in part on the coverage enhancement level, a signaling quantity limit for the location session, wherein the signaling quantity limit indicates a message size limit for a positioning protocol; and sending, to the UE, a first message for the positioning protocol, wherein the first message comprises the signaling quantity limit.

2. The method of claim 1, wherein the LS comprises an Enhanced Serving Mobile Location Center (E-SMLC), a Secure User Plane Location (SUPL) Location Platform (SLP), or a Location Management Function (LMF).

3. The method of claim 1, wherein the message size limit comprises a number of octets.

4. The method of claim 1, wherein the positioning protocol comprises a Long Term Evolution (LTE) Positioning Protocol (LPP) or an LPP/LPP Extensions (LPPe) protocol.

5. The method of claim 4, wherein the first message comprises an LPP or LPP/LPPe Request Location Information message.

6. The method of claim 1, further comprising:

receiving, from the UE, a second message for the positioning protocol, wherein the second message comprises a request for assistance data (AD); and in response to receiving the second message, sending a third message for the positioning protocol to the UE, wherein the third message comprises the AD and wherein the third message satisfies the signaling quantity limit.

7. The method of claim 1, further comprising:

receiving, from the UE, a second message for the positioning protocol, wherein the second message comprises location information (LI), wherein the second message satisfies the signaling quantity limit.

8. A method at a user equipment (UE) for limiting a quantity of signaling for a location session with a location server (LS), the method comprising:

receiving, from the LS, a first message for a positioning protocol, wherein the first message comprises an indication of a signaling quantity limit for the location session, wherein the signaling quantity limit indicates a message size limit for the positioning protocol;

determining a second message for the positioning protocol, wherein the determination is based, at least in part, on the signaling quantity limit; and sending the second message to the LS.

9. The method of claim 8, wherein the message size limit comprises a number of octets.

10. The method of claim 8, wherein:

determining the second message comprises determining a type of assistance data (AD) to request from the LS, wherein the second message comprises a request for the determined type of AD.

11. The method of claim 10, further comprising:

receiving, from the LS, a third message for the positioning protocol, wherein the third message comprises the determined type of AD.

12. The method of claim 8, wherein:

determining the second message comprises determining a type of location information (LI) to send to the LS, wherein the second message comprises the determined type of LI.

13. The method of claim 12, wherein the determined type of LI comprises location measurements or a calculated location.

14. The method of claim 8, wherein the positioning protocol comprises a Long Term Evolution (LTE) Positioning Protocol (LPP) or an LPP/LPP Extensions (LPPe) protocol.

15. The method of claim 14, wherein the first message comprises an LPP or LPP/LPPe Request Location Information message.

16. The method of claim 8, wherein the LS comprises an Enhanced Serving Mobile Location Center (E-SMLC), a Secure User Plane Location (SUPL) Location Platform (SLP) or a Location Management Function (LMF).

17. A location server (LS) comprising:
 a communication interface;
 a memory; and
 a processing unit communicatively coupled with the communication interface and memory and configured to:
  obtain, via the communication interface, a coverage enhancement level for a user equipment (UE);
  determine, based at least in part on the coverage enhancement level, a signaling quantity limit for a location session with the UE, wherein the signaling quantity limit indicates a message size limit for a positioning protocol; and
  send to the UE, via the communication interface, a first message for the positioning protocol, wherein the first message comprises the signaling quantity limit.

18. The LS of claim 17, wherein the LS comprises an Enhanced Serving Mobile Location Center (E-SMLC), a Secure User Plane Location (SUPL) Location Platform (SLP), or a Location Management Function (LMF).

19. The LS of claim 17, wherein the message quantity limit comprises a number of octets.

20. The LS of claim 17, wherein the processing unit is configured to send the first message comprising a Long Term Evolution (LTE) Positioning Protocol (LPP) or an LPP/LPP Extensions (LPPe) Request Location Information message.

21. The LS of claim 17, wherein the processing unit is further configured to:
 receive from the UE, via the communication interface, a second message for the positioning protocol, wherein the second message comprises a request for assistance data (AD); and
 in response to receiving the second message, send a third message for the positioning protocol to the UE via the communication interface, wherein the third message comprises the AD and wherein the third message satisfies the signaling quantity limit.

22. The LS of claim 17, wherein the processing unit is further configured to:
 receive from the UE, via the communication interface, a second message for the positioning protocol, wherein the second message comprises location information (LI), wherein the second message satisfies the signaling quantity limit.

23. A user equipment (UE) comprising:
 a communication interface;
 a memory; and
 a processing unit communicatively coupled with the communication interface and memory and configured to:
  receive from a location server (LS), via the communication interface, a first message for a positioning protocol, wherein the first message comprises an indication of a signaling quantity limit for a location session with the LS, wherein the signaling quantity limit indicates a message size limit for the positioning protocol;
  determine a second message for the positioning protocol, wherein the determination is based, at least in part, on the signaling quantity limit; and
  send the second message to the LS via the communication interface.

24. The UE of claim 23, wherein the processing unit is configured to determine the second message by determining a type of assistance data (AD) to request from the LS, wherein the second message comprises a request for the determined type of AD.

25. The UE of claim 24, wherein the processing unit is configured to receive from the LS, via the communication interface, a third message for the positioning protocol, wherein the third message comprises the determined type of AD.

26. The UE of claim 23, wherein the processing unit is configured to determine the second message by determining a type of location information (LI) to send to the LS, wherein the second message comprises the determined type of LI.

27. The UE of claim 26, wherein the processing unit is configured to obtain the LI by obtaining location measurements, a calculated location, or any combination thereof.

\* \* \* \* \*